United States Patent
Lee et al.

(10) Patent No.: US 10,173,509 B1
(45) Date of Patent: Jan. 8, 2019

(54) WIND DEFLECTOR OF VEHICLE SUNROOF

(71) Applicants: HYUNDAI MOTOR COMPANY, Seoul (KR); KIA MOTORS CORPORATION, Seoul (KR)

(72) Inventors: Sung Won Lee, Gwangmyeong-si (KR); Sung Nam Rim, Suwon-si (KR); Seong Ryong Shin, Seoul (KR); Jae Han Park, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/830,948

(22) Filed: Dec. 4, 2017

(30) Foreign Application Priority Data

Aug. 14, 2017 (KR) .......................... 10-2017-0103246

(51) Int. Cl.
*B60J 7/22* (2006.01)

(52) U.S. Cl.
CPC ....................................... *B60J 7/22* (2013.01)

(58) Field of Classification Search
CPC ......................................................... B60J 7/22
USPC ........................................................ 296/217
See application file for complete search history.

(56) References Cited

U.S. PATENT DOCUMENTS

| | | | |
|---|---|---|---|
| 6,695,399 B2 * | 2/2004 | Pfertner | B60J 7/22 296/217 |
| 8,931,830 B2 * | 1/2015 | Vogel | B60J 7/22 296/217 |
| 2004/0041445 A1 * | 3/2004 | Cooney | B60J 7/05 296/217 |

FOREIGN PATENT DOCUMENTS

| | | | |
|---|---|---|---|
| DE | 10062730 C1 * | 6/2002 | B60J 7/22 |
| DE | 2006019967 | * 10/2007 | |
| JP | 2012-081876 A | 4/2012 | |
| KR | 10-1585469 B1 | 1/2016 | |
| KR | 10-2016-0054258 A | 5/2016 | |
| WO | 2016-035455 A1 | 3/2016 | |
| WO | 2017088954 | * 12/2017 | |

* cited by examiner

*Primary Examiner* — Dennis H Pedder
(74) *Attorney, Agent, or Firm* — McDermott Will & Emery LLP

(57) ABSTRACT

A wind deflector of a vehicle sunroof for effectively reducing droning noise that is generated when the sunroof is open includes a deflector bar rotating to unfold and fold a mesh deflector and divided into a front deflector bar and rear deflector bars so that a length of the deflector bar is changed by stretching and contracting when rotating the deflector bar. When the mesh deflector bar is unfolded upward with opening of the sunroof, the front deflector bar is linearly moved forward (in a front-rear direction of the vehicle) by guide bars rotatably coupled to a sunroof frame such that an upper end is moved ahead of an lower end of the mesh deflector.

6 Claims, 3 Drawing Sheets

[FIG. 1]
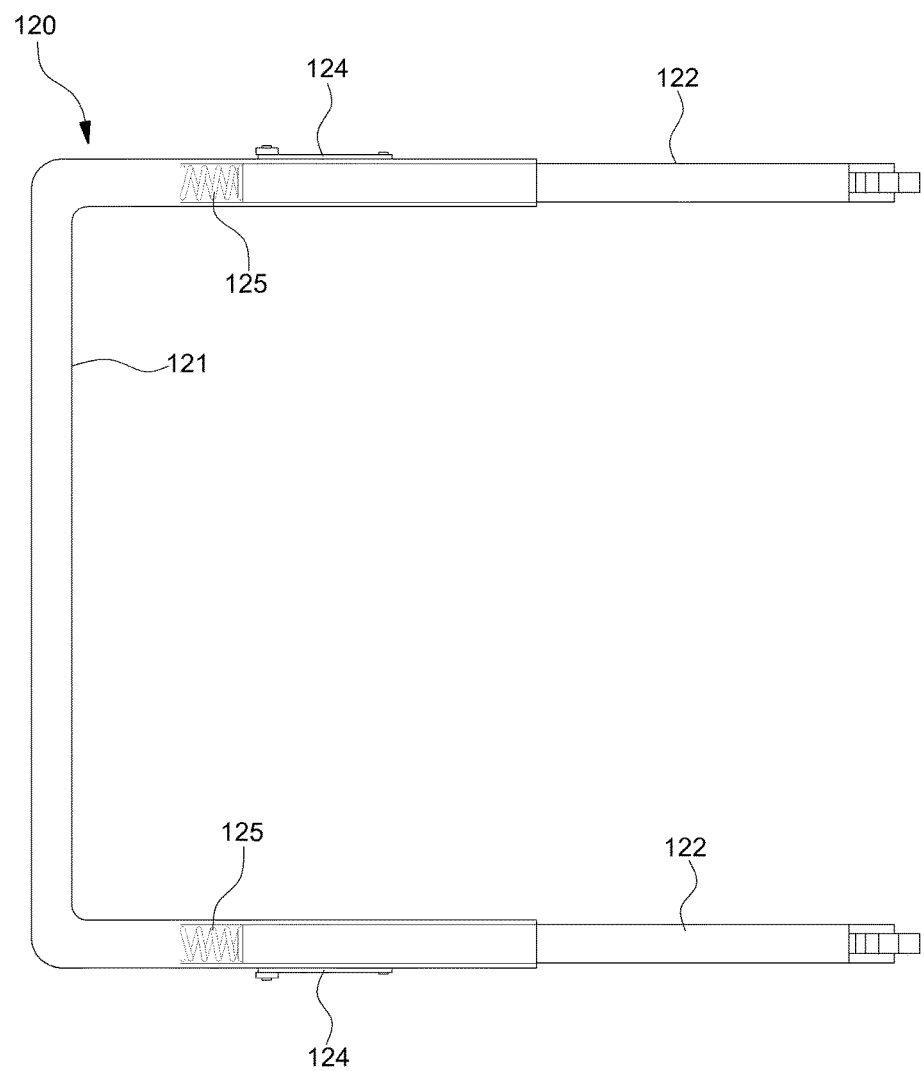

[FIG. 2]
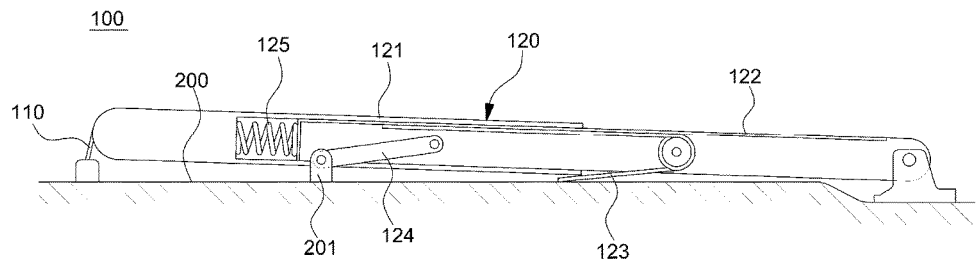
[FIG. 3]
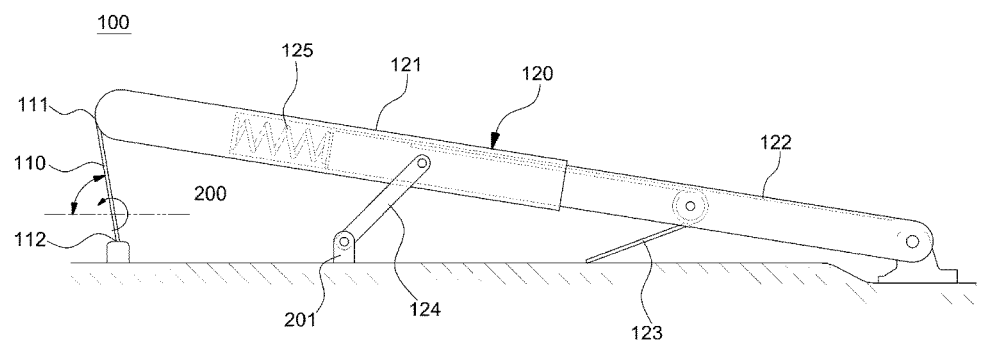
[FIG. 4]
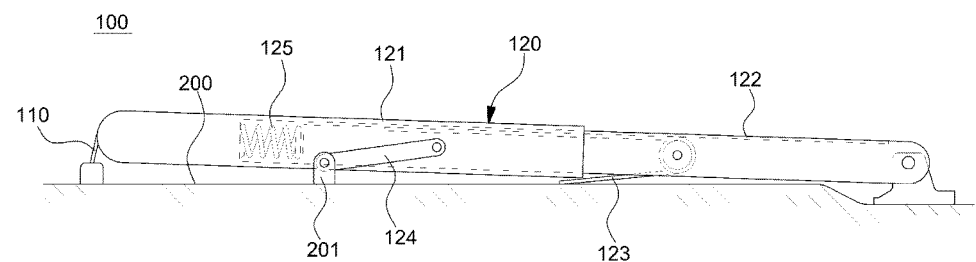

[FIG. 5]
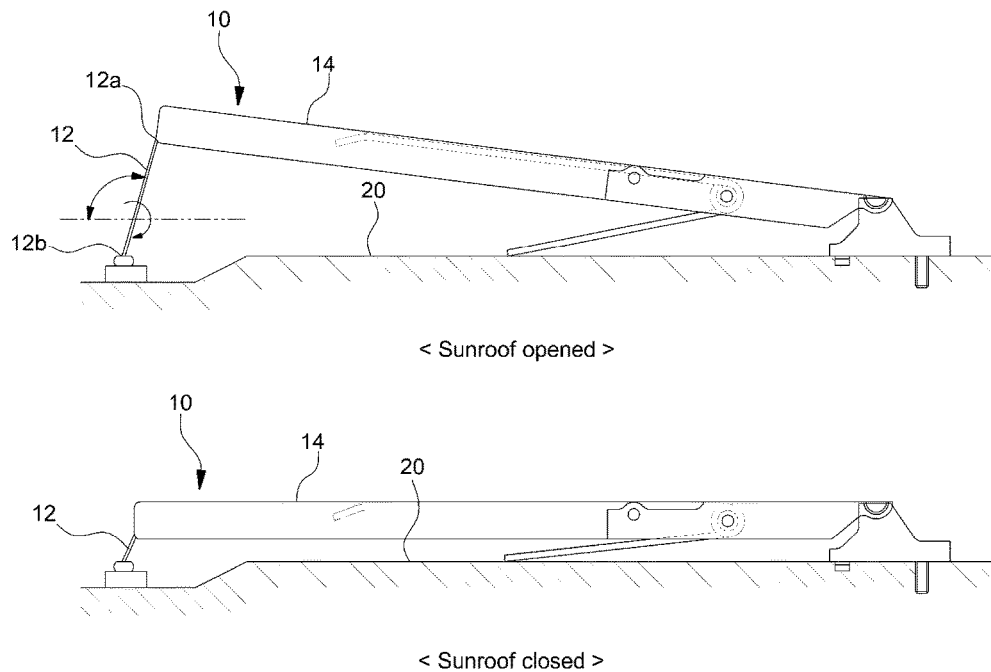
< Sunroof opened >
< Sunroof closed >
[FIG. 6]
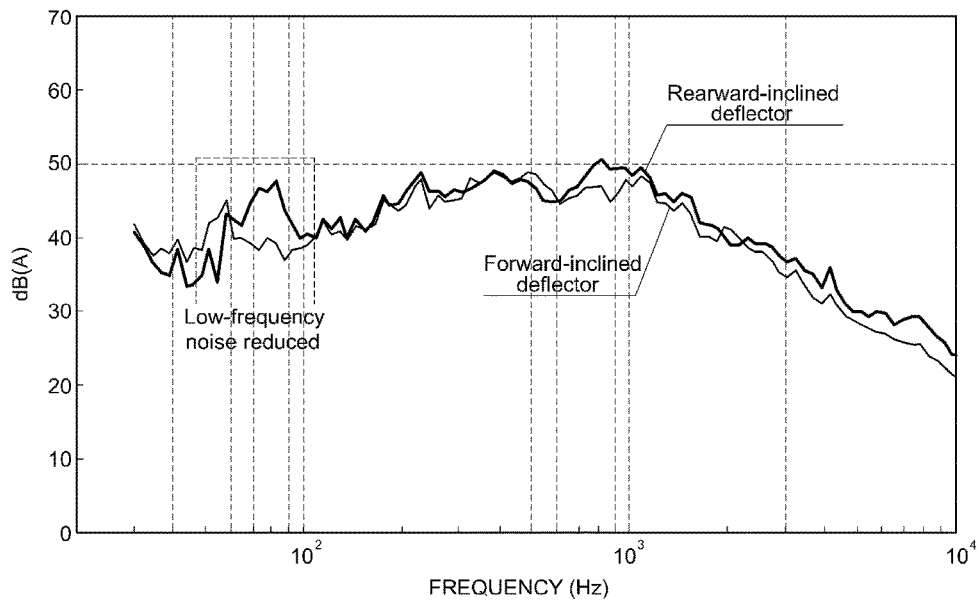

WIND DEFLECTOR OF VEHICLE SUNROOF

CROSS REFERENCE TO RELATED APPLICATION

The present application claims priority to Korean Patent Application No. 10-2017-0103246, filed Aug. 14, 2017, the entire contents of which is incorporated herein for all purposes by this reference.

TECHNICAL FIELD

The present disclosure relates to a wind deflector of a vehicle sunroof and, more particularly to a wind deflector of a vehicle sunroof for effectively reducing droning noise that is generated when a sunroof is opened.

BACKGROUND

In general, when the sunroof of a vehicle is opened, droning noise, that is, noise and vibration due to interaction of the external air flowing over the opening (which is opened by the sunroof) of the sunroof on the roof of a vehicle and the internal air of the vehicle are generated. This phenomenon is caused by synchronization of an excitation frequency and an indoor sound field due to the flow of external air within a predetermined range of vehicle speed.

Further, when the sunroof is opened outward from a vehicle, the external air hits against the structure of the sunroof, thereby generating wind noise (noise due to a vortex produced by breakage of the streamline of air flowing around the sunroof while the vehicle is driven).

A wind deflector for optimizing airflow over the opening of sunroof is applied to the sunroof to reduce the droning noise and wind noise.

The wind deflector, which is a device that disturbs airflow over the roof of the vehicle to prevent booming droning noise when the sunroof is opened, is classified into a type that lifts airflow over the roof of the vehicle and a type that decreases the speed of airflow.

A mesh deflector is representative of the wind deflector that decreases the speed of airflow when passing through the mesh deflector, whereby the droning noise is suppressed.

The higher the mesh deflector, the more advantageous it is in reducing the droning noise by the sunroof, but the height is also a factor of causing the wind noise by the deflector. Accordingly, there is a limit in reducing droning noise and wind noise due to a sunroof (noise by external air hitting against the structure of a sunroof) by increasing the height of a deflector.

SUMMARY

The present disclosure has been made to reduce noise such as droning noise even without increasing the height of a deflector and an object of the present disclosure is to provide a wind deflector of a vehicle sunroof, in which a deflector bar rotating to unfold and fold a mesh deflector is divided into a front deflector bar and rear deflector bars so that the deflector bar changes length by stretching and contracting when rotating, and when the mesh deflector bar is unfolded upward with opening of the sunroof, the front deflector bar is linearly moved forward (in the front-rear direction of the vehicle) by guide bars rotatably coupled to a sunroof frame such that the upper end is moved ahead of the lower end of the mesh deflector.

A wind deflector of a vehicle sunroof according to an aspect of the present disclosure includes: a mesh deflector reducing a speed of air passing through the mesh deflector; and a deflector actuator rotating to unfold the mesh deflector, in which when the deflector actuator rotates to unfold the mesh deflector, an upper end of the mesh deflector is positioned ahead of a lower end of the mesh deflector.

The deflector actuator may include: rear deflector bars having a first end rotatably coupled to a sunroof frame; a front deflector bar rotating together with the rear deflector bars and combined with the rear deflector bars to be movable in a longitudinal direction of the rear deflector bars; guide bars linearly moving the front deflector bar in the longitudinal direction of the rear deflector bars when the rear deflector bars are rotated about the first end; and elastic members providing rotation force to the rear deflector bars to unfold the mesh deflector.

The upper end of the mesh deflector may be fixed to the front deflector bar, the lower end of the mesh deflector bar may be fixed to the sunroof frame, and the upper end may be moved ahead of the lower end of the mesh deflector when the rear reflector bars are rotated to unfold the mesh deflector.

The guide bars may have a first end rotatably coupled to the sunroof frame, a second end rotatably fixed to the front deflector bar, and when the mesh deflector has been folded and unfolded, the first ends may be positioned ahead of the second ends of the guide bars. Further, when the front deflector bar is rotated with the rear deflector bars, the guide bars are rotated up in the opposite direction to the front deflector bar.

Support springs that can contract and restore may be disposed between the front reflector bar and the rear reflector bars inserted in the front reflector bar and may elastically support the front deflector bar when the front deflector bar is moved forward with rotation of the rear deflector bars. Accordingly, the support springs are restored when the mesh deflector is unfolded, and they are compressed with the mesh deflector is folded.

The wind deflector of a vehicle sunroof according to the present disclosure can effectively reduce droning noise without increasing the height thereof in comparison to the wind deflectors of the related art, so it is also possible to prevent an increase in deflector wind noise due to an increase in height of the wind deflector.

BRIEF DESCRIPTION OF THE DRAWINGS

The above and other objects, features and other advantages of the present disclosure will be more clearly understood from the following detailed description when taken in conjunction with the accompanying drawings, in which:

FIGS. 1 and 2 show views showing a wind deflector of a vehicle sunroof according to an embodiment of the present disclosure;

FIG. 3 shows a view showing an operation state of the wind deflector according to an embodiment of the present disclosure when a sunroof is opened;

FIG. 4 shows a view showing an operation state of the wind deflector according to an embodiment of the present disclosure when a sunroof is closed;

FIG. 5 shows a view showing an operation state of a wind deflector of the related art when a sunroof is opened and closed; and FIG. 6 shows a graph comparing the results of measuring droning noise when the wind deflector according to the present disclosure and the wind deflector of the related art were applied to a vehicle.

DETAILED DESCRIPTION

First, in order to help understand the present disclosure, a wind deflector using the type of reducing the speed of airflow of the related art is briefly described.

As shown in FIG. 5, a wind deflector 10 reduces the speed of airflow, which is provided to prevent droning noise by reducing the speed of airflow over the roof of a vehicle. The wind deflector 10 includes a mesh deflector 12 which is unfolded or folded, as a single deflector bar 14 on a sunroof frame 20 is rotated. In particular, when the sunroof is opened and the mesh deflector 12 unfolds up, the upper end 12a of the mesh deflector 12a is positioned behind the lower end 12b (in the front-rear direction of a vehicle) (hereinafter, the structure of the mesh deflector 12a is referred to as a "rearward-inclined structure"). Accordingly, when air passes through the mesh deflector 12, a clockwise rotational force component is generated by a velocity gradient. The rotational force component, which is a rotational force component in the same direction (clockwise) of downward flow that causes droning noise of the sunroof, becomes a factor that may increase droning noise.

Further, the higher the mesh deflector 12, the more advantageous it is in reducing droning noise due to the sunroof, but the height is a factor of wind noise (deflector wind noise) by the deflector. Accordingly, there is a limit in reducing droning noise and wind noise due to the sunroof (noise by external air hitting against the structure of a sunroof) by increasing the height of a deflector.

In other words, the conditions for reducing droning noise and deflector wind noise that are influenced by the height of the mesh deflector 12 conflict with each other, so when the deflector height is increased to reduce droning noise, the deflector wind noise is increased. Accordingly, there is a limit in reducing droning noise and wind noise due to a sunroof by adjusting the deflector height.

Accordingly, the present disclosure proposes a forward-inclined wind deflector that can more effectively reduce droning noise as compared with the rearward-inclined wind deflector according to the related art under the condition that the height is the same, that is, a wind deflector having a structure in which a mesh deflector is unfolded upward with opening of a sunroof, the upper end of the mesh deflector is positioned ahead of the lower end (in the front-rear direction of a vehicle) (hereafter, referred to as a forward-inclined structure).

That is, in the present disclosure, a deflector actuator for unfolding and folding a mesh deflector is configured to longitudinally stretch and contract with rotation for operating the mesh deflector so that when a sunroof is opened, the mesh deflector is unfolded upward with the upper end of the mesh deflector positioned ahead of the lower end, thereby being able to remove the factor increasing droning noise that is generated when air flows through the mesh deflector.

A wind deflector according to an embodiment of the present disclosure is described hereafter with reference to FIGS. 1 to 4 and it should be noted that the up-down, left-right, and front-rear directions stated herein are based on the up-down, left-right, and front-rear directions of a vehicle equipped with a sunroof and a wind deflector.

FIG. 1 shows a plan view of a combination structure of a front deflector bar and rear deflector bars, FIG. 2 shows a side view of the combination structure of the front deflector bar and the rear deflector bars, FIG. 3 shows the operation state of a wind deflector when a sunroof is opened, and FIG. 4 shows the operation state of the wind deflector when a sunroof is closed.

As shown in FIGS. 1 to 4, a wind deflector according to the present disclosure includes a mesh deflector 110 that can reduce the flow speed of external air and a deflector actuator 120 for unfolding up the mesh deflector 110 when a sunroof is opened.

The mesh deflector 110, which is a deflector member having a mesh structure that can pass air, reduces the flow speed of air passing therethrough by disturbing airflow over the roof of a vehicle by unfolding when a sunroof is open while the vehicle is driven.

The mesh deflector 110 is disposed on a sunroof 200 such that it is folded on the sunroof frame 200 when the sunroof is closed, and it can be pulled up away from the roof of the vehicle and unfolded upward flat when the sunroof is opened.

The deflector actuator 120, which is operated when the sunroof is opened, pulls up and unfolds the mesh deflector 110 at an inclined over the roof of the vehicle by rotating in a predetermined direction (that is, in a direction in which the mesh deflector is unfolded) when the sunroof is opened.

The deflector actuator 120 unfolds the mesh deflector 110 with the upper end 111 of the mesh deflector positioned ahead of the lower end (based on the up-down direction of the vehicle) when operating to unfold the mesh deflector 110, and to this end, the deflector actuator 120 includes a front deflector bar 121, rear deflector bars 122, elastic members 123, and guide bars 124.

The front deflector bar 121 is longitudinally fitted on the rear deflector bars 122 and positioned ahead of the rear deflector bars 122. Further, in the embodiment shown in FIGS. 1 to 4, the front portions of the rear deflector bars 122 are movably fitted in the rear portion of the front deflector bar 121, but the rear portion of the front deflector bar 121 may be movably fitted in the front portions of the rear deflector bars 122.

The front deflector bar 121 has a predetermined length and the upper end of the mesh deflector 110 is fixed to the longitudinal front portion (in detail, the front end of the front portion) of the front deflector bar 121, for example, by bonding.

The rear deflector bars 122 also have a predetermined length and the longitudinal rear portions (in detail, the rear end of the rear portion) thereof are rotatably coupled to the sunroof frame 200.

The elastic members 123, which are springs disposed between the rear deflector bars 122 and the sunroof frame 200 to provide rotational force to the rear deflector bars 122, rotate the rear deflector bars 122 in the unfolding direction of the mesh deflector 110 using elastic return force generated when they are compressed. Accordingly, the elastic members 123 are disposed between the rear deflector bars 122 and the sunroof frame 200 to be compressed when the sunroof is closed.

That is, the elastic members 123 are compressed to generate and keep elastic return force when the sunroof is closed, and they are stretched to apply rotational force to the rear deflector bars 122 by restoring and acting the elastic return force when the sunroof is opened.

Though not shown in the figures, the elastic members 123 are compressed when the sunroof is closed because the rear deflector bars 122 are disposed under the sunroof, but when the sunroof is opened, the sunroof over the rear reflector bars 122 is removed and the elastic members 123 are decompressed and restored, so the rear deflector bars 122 are pushed up by the elastic return force.

That is, when the sunroof is closed, the rear deflector bars 122 receive the elastic return force from the elastic members 123, but cannot be rotated by the sunroof (are locked by the sunroof), and when the sunroof is opened and locking by the sunroof is removed, the rear deflector bars 122 are rotated by the elastic members 123 such that the mesh deflector 110 can be unfolded.

When the rear deflector bars 122 are rotated by the elastic return force from the elastic member 123, the front deflector bar 121 is rotated together with the rear deflector bars 122. Further, even though the sunroof is closed and the rear deflector bars 122 are rotated to fold down the mesh deflector 110, the front deflector bar 121 is rotated together with the rear deflector bars 122.

The sunroof frame 200 is disposed under the sunroof on the roof of the vehicle, the deflector actuator 120 is disposed between the sunroof frame 200 and the closed sunroof, and the lower end of the mesh deflector is fixed to the front portion (in detail, the front end of the front portion) of the sunroof frame 200 by bonding for example.

As shown in FIG. 1, the rear deflector bars 122 is provided in pairs and disposed at left and right sides of the sunroof frame 200, while the front deflector bar 121 is a U-shaped single member and disposed ahead of the pair of rear deflector bars 122 to partially overlap the rear deflector bars 122.

Meanwhile, the guide bars 124, which are provided to linearly move the front deflector bar 121 in the longitudinal direction of the rear deflector bars 122 when the rear deflector bars 122 are rotated, are rotatably disposed between the sunroof frame 200 and the front deflector bar 121.

As shown in FIGS. 1 to 4, the guide bars 124 have a predetermined length and have a longitudinal first end rotatably coupled in a hinged type to the sunroof frame 200 and a second end rotatably coupled in a hinged type to the front deflector bar 121 and the first end coupled to the sunroof frame 200 is positioned behind the second end coupled to the front deflector bar 121. Accordingly, when the front deflector bar 121 is rotated together with the rear deflector bars 122, the guide bars 124 are rotated in the opposite direction to the front deflector bar 121 to be erected or laid, thereby linearly moving the front deflector bar 121 with respect to the rear deflector bars 122.

It is preferable that the first ends coupled to the sunroof frame 200 are always positioned behind the second ends coupled to the front deflector bar 121 regardless of the rotated position of the guide bars 124, but the first end may be positioned in the same vertical line with the second end when the mesh deflector 110 is fully unfolded.

As described above, since the guide bars 124 are disposed between the front deflector bar 121 and the sunroof frame 200, when the rear deflector bars 122 are rotated to unfold the mesh deflector 110, that is, when the mesh deflector 110 has been unfolded, the upper end 111 of the mesh deflector and the front end of the front deflector bar 121 are positioned ahead of the lower end of the mesh deflector 110. Further, when the sunroof is closed and the rear deflector bars 122 are rotated to fold the mesh deflector 110, that is, when the mesh deflector 110 has been folded, the front end 111 of the mesh deflector and the front end of the front deflector bar 121 are positioned behind the lower end 112 of the mesh deflector.

That is, since the guide bars 124 are rotated in the opposite direction to the rear deflector bars 122 when the rear deflector bars 122 are rotated, the front deflector bar 121 is linearly moved in the front-rear direction with respect to the rear deflector bars 122 fixed in a hinge type to the sunroof frame 200 when the rear deflector bars 122 are rotated. In particular, when the rear deflector bars 122 are rotated to unfold the mesh deflector 110, the upper end 111 of the mesh deflector fixed to the front deflector bar 121 is moved ahead of the lower end 112 of the mesh deflector.

The guide bars 124 may be coupled in a hinged type to mounting brackets 201 on the sunroof frame 200 and sides of the front deflector bar 121. The rear deflector bars 122 may have a cross-section with a partially open lower end or may have a hole through which the elastic member 123 can be inserted so that the deflector actuator 120 including the guide bars 124 and the elastic members 123 can be smoothly operated.

Further, support springs 125 that can be compressed and restored may be further disposed between the front deflector bar 121 and the rear deflector bars 122 inserted in the front deflector bar 121.

The support springs 125 are restored when the mesh deflector is unfolded by rotation of the rear deflector bars 122, and they are compressed when the mesh deflector 110 is folded. Accordingly, the support springs 125 prevent the front deflector bar 121 from being pushed rearward by strong wind and elastically support the front deflector bar 121 when the front deflector bar 121 is linearly moved forward with respect to the rear deflector bars 122.

When the mesh deflector 110 is unfolded in a high-speed driving state, the air over the roof of the vehicle flows at a high speed through the mesh deflector 110, so the front deflector bar 121 may be pushed rearward. However, when the support springs 125 are provided, the support springs 125 elastically support the front deflector bar 121 to prevent the front deflector bar 121 from being pushed rearward, so it is possible to prevent shaking of the front deflector bar 121.

Further, the support springs 125 also assist the front deflector bar 121 moving forward in the early stage of the front deflector bar 121 moving forward with rotation of the rear deflector bars 122.

The wind deflector 100 having this configuration according to the present disclosure can more effectively reduce droning noise in comparison to the deflector having a rearward-inclined structure (hereafter, referred to as a rearward-inclined deflector) (see wind deflector 10 in FIG. 5) of the related art when it has the same height as the rearward-inclined deflector of the related art.

This is because when the mesh deflector 110 is unfolded and inclined forward, as in the wind deflector 100 of the present disclosure, the airflow that has passed through the mesh deflector 110 generates a rotational component in the opposite direction to downward flow that causes droning noise, so the intensity of the downward flow vibrating the interior air can be reduced.

In detail, according to the rearward-inclined deflector 10 (see FIG. 5) having the method of reducing the speed of airflow, when air flows through the mesh deflector 12, a difference in speed of airflow is generated at the upper and lower portions the mesh deflector 12, so the rotational component of the airflow and the rotational component of the downward flow causing droning noise are generated in the same direction, thereby vibrating the interior air and increasing droning noise.

However, according to the wind deflector 100 having a forward-inclined structure of the present disclosure, when air flows through the mesh deflector 110, a difference in speed of airflow is generated in the same way at the upper and lower portions of the mesh deflector 110, but the rotational component of the airflow and the rotational component of downward flow causing droning noise are generated in the opposite directions, so the rotational component vibrating the interior air is offset and thus droning noise can be reduced (see FIG. 3).

Accordingly, even if having a smaller height than the rearward-inclined deflector 10, the wind deflector 100 of the present disclosure can reduce droning noise at the same level as the rearward-inclined deflector 10 by effectively reducing droning noise. Further, since the wind deflector 100 is smaller in height than the rearward-inclined wind deflector 10 of the related art, the portion exposed to airflow over the roof of the vehicle is decreased, so deflector wind noise (noise generated by external air hitting against the wind deflector) can also be reduced. Further, the area of the slipstream generated by the wind deflector (airflow that has passed through the mesh deflector) is increased, so sunroof wind noise (noise generated by external air hitting against the sunroof exposed outside the vehicle) is reduced.

When a wind deflector employs the length-fixed single deflector bar 14 that has been used for unfolding and folding the mesh deflector 12 of the rearward-inclined wind deflector 10, the mesh deflector is folded outward and exposed ahead of the sunroof frame. Accordingly, there is a need for a specific space for the mesh deflector exposed ahead of the sunroof frame, so the opening amount of the sunroof is relatively reduced. Further, when the mesh deflector is folded, it may be stuck between the sunroof glass and the roof panel of the vehicle.

However, according to the wind deflector 100 having a forward-inclined structure (hereafter, referred to as a forward-inclined deflector) of the present disclosure, the deflector actuator 120 for unfolding and folding the mesh deflector 110 has a variable length by stretching and contracting and the length of the deflector actuator 120 is changed when the deflector actuator 120 is rotated. Accordingly, the mesh deflector 110 is folded to the same position as in the rearward-inclined deflector of the related art, so it is possible to prevent the problem that the mesh deflector 110 is exposed ahead of the sunroof 20 and it is also possible to prevent the problem that the opening amount of the sunroof is reduced and the mesh deflector is stuck.

Further, since the conditions for reducing the deflector wind noise and the droning noise conflict with each other, there is a need for tuning that appropriately sets the height of the wind deflector; however, since the forward-inclined deflector 100 of the present disclosure can reduce both of the deflector wind noise and the droning noise, it is possible to decrease the cost that is generated by the tuning process for setting an optimal condition for reducing the deflector wind noise and the droning noise.

On the other hand, FIG. 6 shows a graph comparing the results of measuring droning noise when the wind deflector according to the present disclosure and the wind deflector of the related art were applied to a vehicle, in which droning noise was measured under the same conditions (vehicle speed, road surface, noise measurement position etc.) for a forward-inclined deflector and rearward-inclined deflector designed under the same conditions (height of the wind deflectors, material of the mesh deflectors etc.) except for the inclined direction of the mesh deflectors.

As shown in FIG. 6, it was found that the droning noise generated when the forward-inclined deflector was applied was generated less in a relatively high frequency band in comparison to the droning noise generated when the rearward-inclined deflector was applied. In particular, it was found that droning noise at a low frequency band was reduced with a remarkable difference.

Therefore, it can be seen that the forward-inclined deflector can more effectively reduce droning noise, as compared with the rearward-inclined deflector, so it is possible to estimate that it would be possible to sufficiently reduce droning noise even with a forward-inclined deflector lower than common rearward-inclined deflectors, and it can be seen that the smaller the height, the more the deflector wind noise can be reduced. Further, it is possible to estimate reduction of sunroof wind noise by an increase in the slipstream area behind the wind deflector.

Although embodiments of the present disclosure were described in detail above, the scope of the present disclosure is not limited thereto and various changes and modifications from the spirit of the present disclosure defined in the following claims by those skilled in the art are also included in the scope of the present disclosure.

What is claimed is:

1. A wind deflector of a vehicle sunroof, the wind deflector comprising:
   a mesh deflector reducing a speed of air passing through the mesh deflector; and
   a deflector actuator rotating to unfold the mesh deflector, wherein the deflector actuator is configured to be longitudinally stretched and contracted with rotation so as to unfold the mesh deflector and an upper end of the mesh deflector is finally positioned ahead of a lower end of the mesh deflector when the deflector actuator rotates.

2. The wind deflector of claim 1, wherein the deflector actuator includes:
   a rear deflector bar having a first end rotatably coupled to a sunroof frame;
   a front deflector bar rotating together with the rear deflector bar and combined with the rear deflector bar to be movable in a longitudinal direction of the rear deflector bar;
   a guide bar linearly moving the front deflector bar in the longitudinal direction of the rear deflector bar when the rear deflector bar is rotated about the first end; and
   an elastic member providing rotation force to the rear deflector bar to unfold the mesh deflector.

3. The wind deflector of claim 2, wherein the upper end of the mesh deflector is fixed to the front deflector bar, the lower end of the mesh deflector bar is fixed to the sunroof frame.

4. The wind deflector of claim 2, wherein the guide bar has a first end rotatably coupled to the sunroof frame and a second end rotatably fixed to the front deflector bar, and when the mesh deflector has been folded and unfolded, the first end of the guide bar is positioned ahead of the second end of the guide bar.

5. The wind deflector of claim 2, wherein a support spring that compresses and restores is disposed between the front reflector bar and the rear reflector bar and is inserted in the front reflector bar and elastically supports the front deflector bar when the front deflector bar is moved forward with rotation of the rear deflector bar.

6. A wind deflector of a vehicle sunroof, the wind deflector comprising:
   a mesh deflector reducing a speed of air passing through the mesh deflector; and
   a deflector actuator rotating to unfold the mesh deflector, wherein the deflector actuator is configured to be longitudinally stretched and contracted with rotation so as to unfold the mesh deflector such that an upper end of the mesh deflector is positioned ahead of a lower end of the mesh deflector when the deflector actuator rotates,
wherein the deflector actuator includes:
- a rear deflector bar having a first end rotatably coupled to a sunroof frame; and
- a front deflector bar rotating together with the rear deflector bar and combined with the rear deflector bar to be movable in a longitudinal direction of the rear deflector bar.

\* \* \* \* \*